United States Patent [19]
Shu et al.

[11] Patent Number: 5,450,148
[45] Date of Patent: Sep. 12, 1995

[54] LASER POINTER WITH SELECTABLE POINTER PATTERNS

[75] Inventors: Lin Yu Shu, 4F No. 2 Alley 7 Lane 41 Chen-Kong Rd. Sec. 4, Taipei; Ray-Ing Ni, 186, Lane 437, Jenn-Hsing Rd., Taichung, both of Taiwan

[73] Assignees: Yu S. Lin, Taipei; Ray-Ing Ni, Taichung; Fang-Ing Lin, Taipei, all of Taiwan; Wei-Chang W. Liauh, Md.

[21] Appl. No.: 229,260

[22] Filed: Apr. 18, 1994

[51] Int. Cl.⁶ .............................................. G03B 21/00
[52] U.S. Cl. ........................................ 353/42; 353/43; 362/259
[58] Field of Search ................. 353/42, 43, 97, 62; 116/288, 297, 328, 332, DIG. 6; 362/121, 259, 807

[56] References Cited

U.S. PATENT DOCUMENTS

| | | | |
|---|---|---|---|
| 3,656,845 | 4/1972 | Koch-Bossard et al. | 353/42 |
| 4,060,318 | 11/1977 | Hansford | 353/42 |
| 4,097,134 | 6/1978 | Jerie | 353/42 |
| 4,779,176 | 10/1988 | Bornhorst | 353/42 |
| 5,268,829 | 12/1993 | Lo | 362/259 |
| 5,321,449 | 6/1994 | Coccoli et al. | 353/43 |

FOREIGN PATENT DOCUMENTS 0377145  6/1923  Germany ................. 353/43

Primary Examiner—Thomas B. Will
Assistant Examiner—William C. Dowling
Attorney, Agent, or Firm—W. Wayne Liauh

[57] ABSTRACT

A laser pointer for projecting a laser beam with a selectable pointer pattern onto a projected screen during presentations comprising a shell body, a laser beam generating device, and a pointer pattern selector; the laser beam generating device is disposed in the front portion of the shell body and the pointer pattern selector is disposed in the rear portion of the shell body. The pointer pattern selector comprises a plurality of pointer patterns of varying geometric shapes and/or sizes, and the user can place one of the pointer patterns in the laser beam path using a rotational assembly or a horizontal shifting method so as to project a laser beam having the desired pointer pattern onto the projected screen. A magnifying lens is placed before each pointer pattern to enlarge the cross-sectional area of the laser beam to be projected through the selected pointer pattern. The magnifying lens can be in the form of a cylindrical lens so as to project a line-shaped pointer pattern.

13 Claims, 9 Drawing Sheets

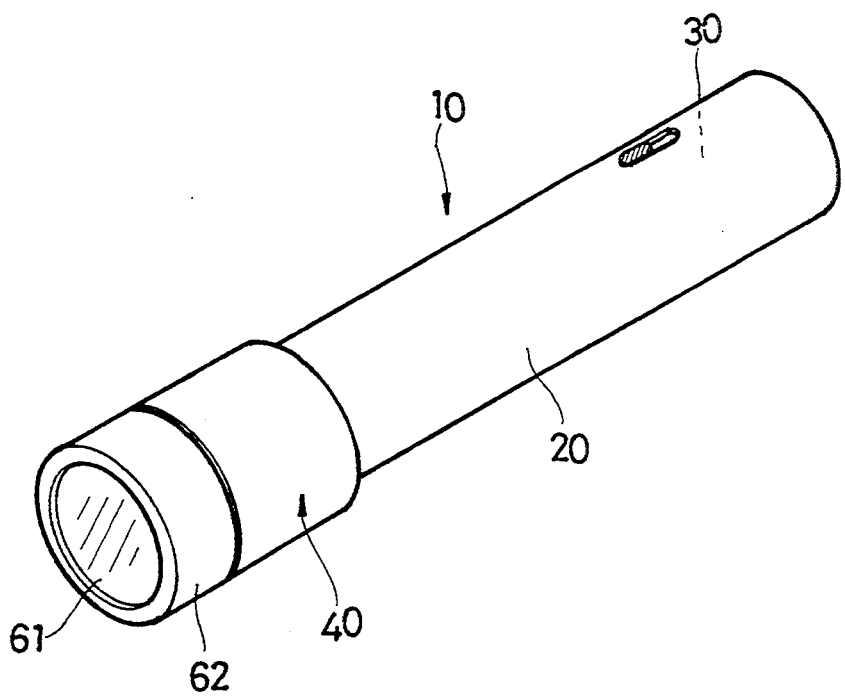
F I G. 1
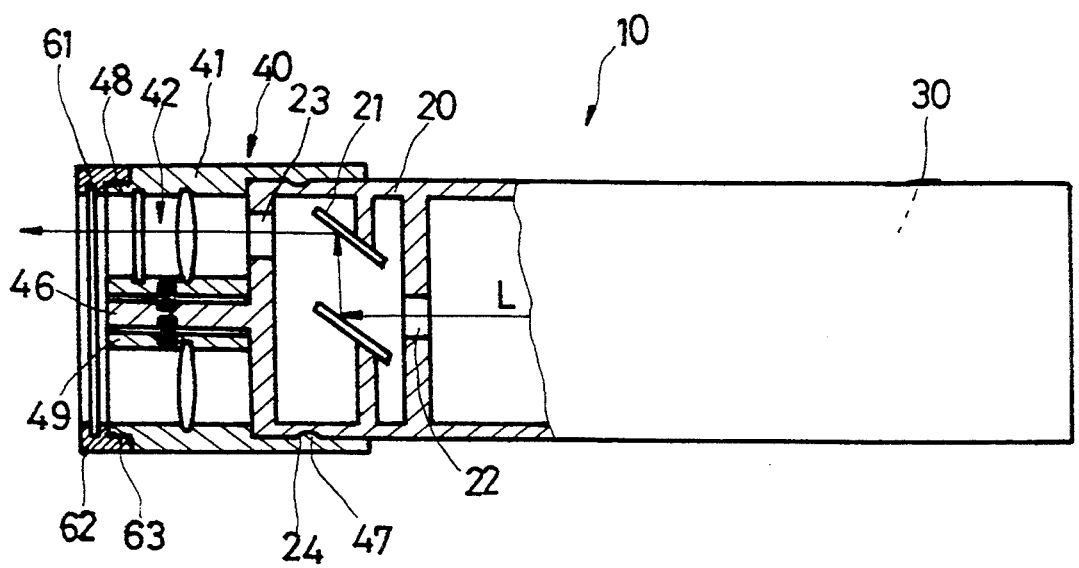
F I G. 2

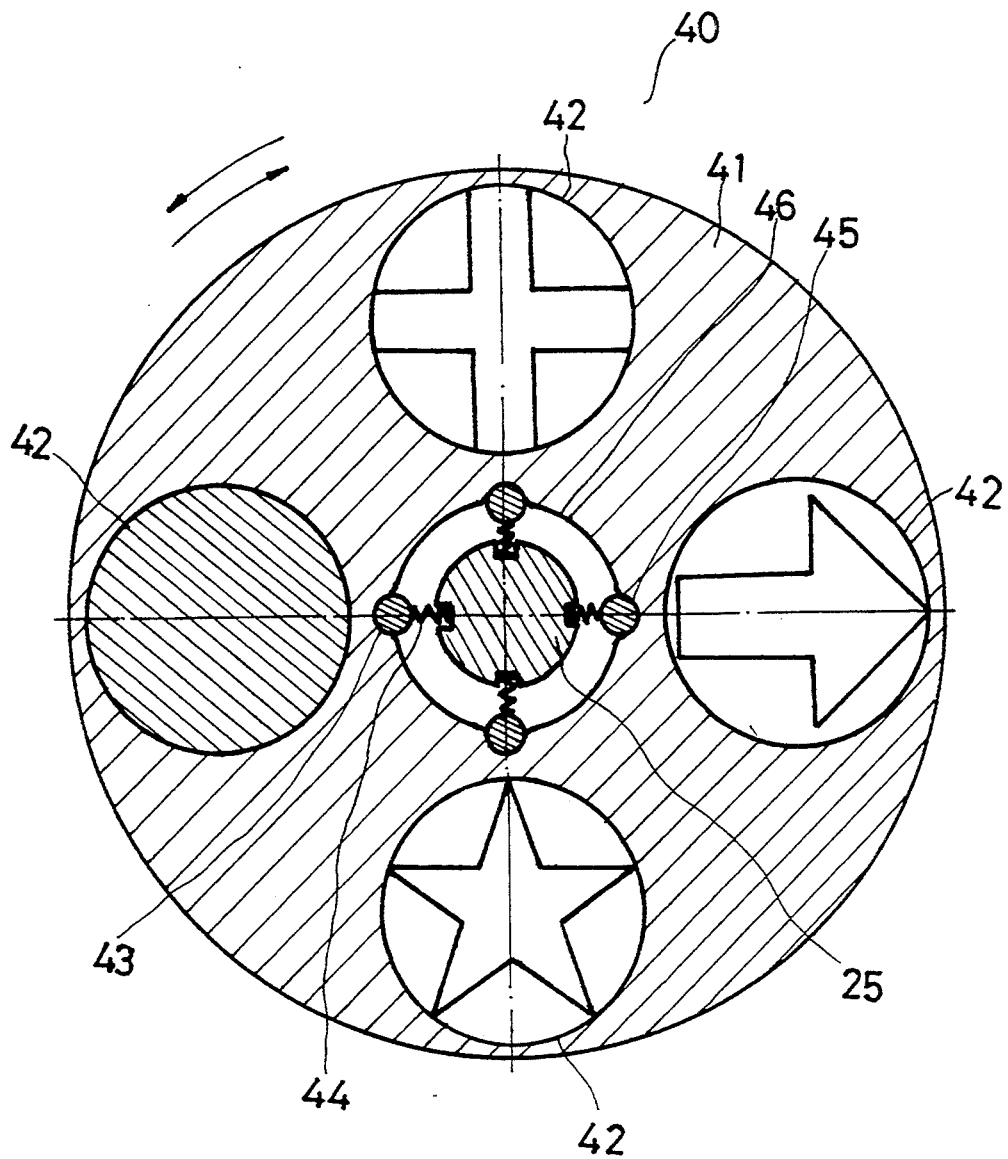
F I G. 5

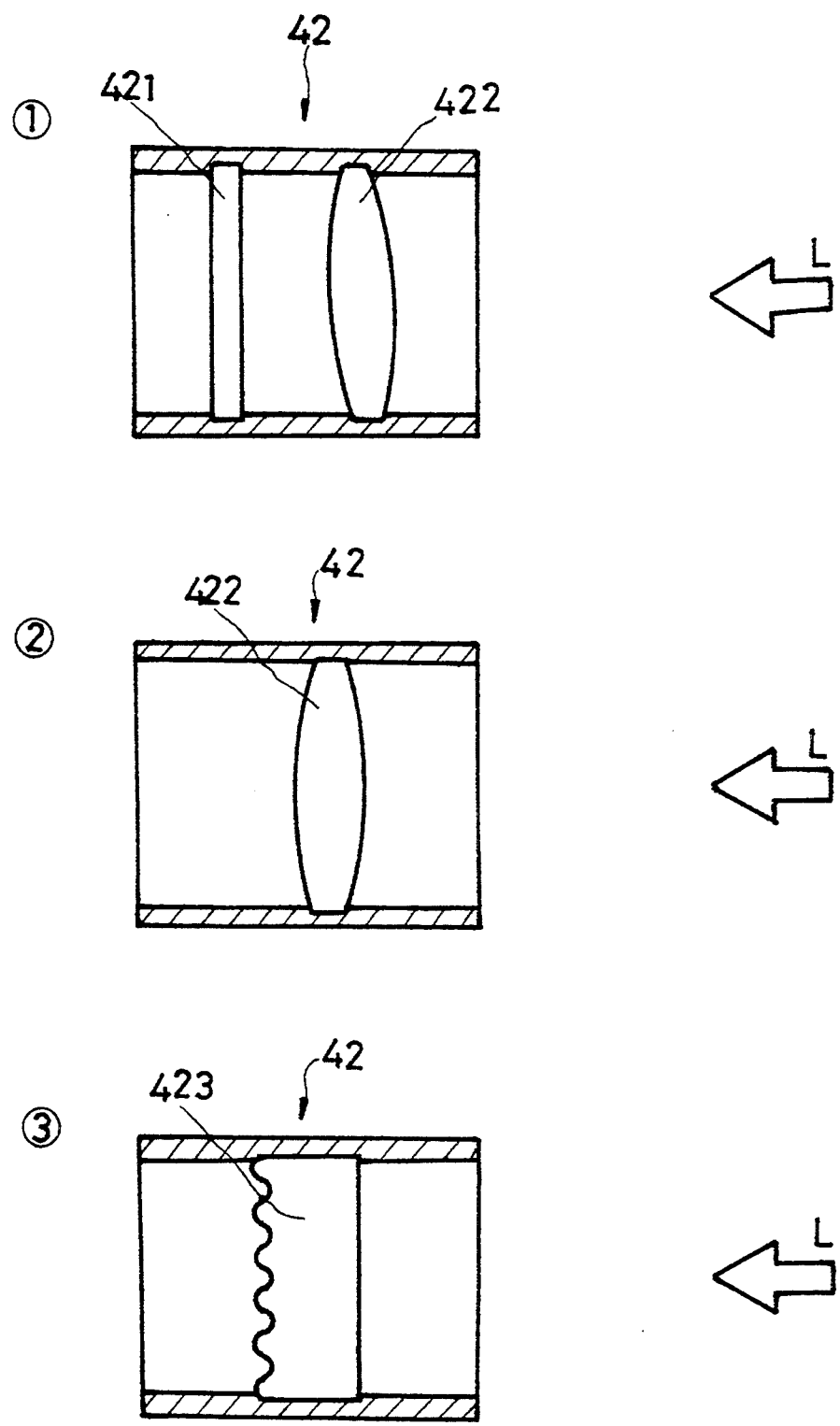
F I G. 7

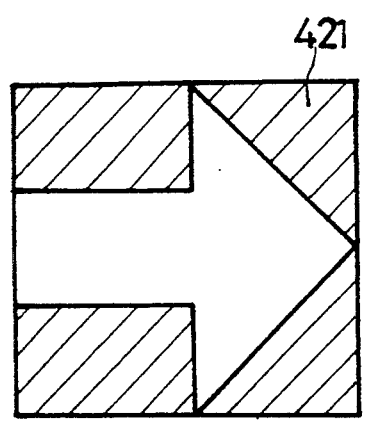 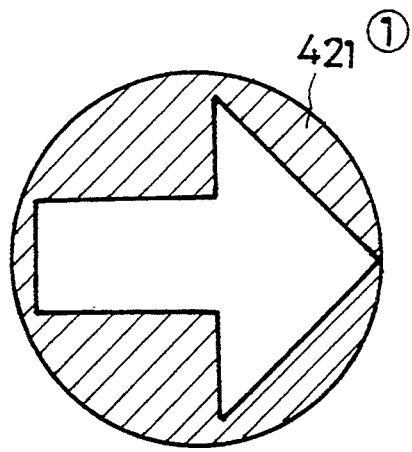
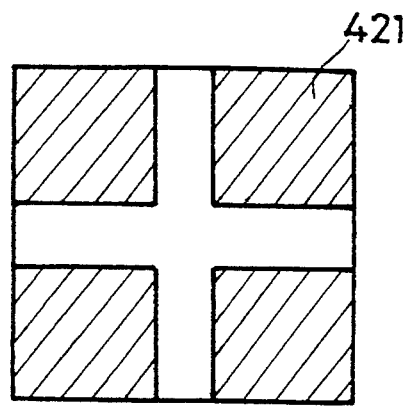 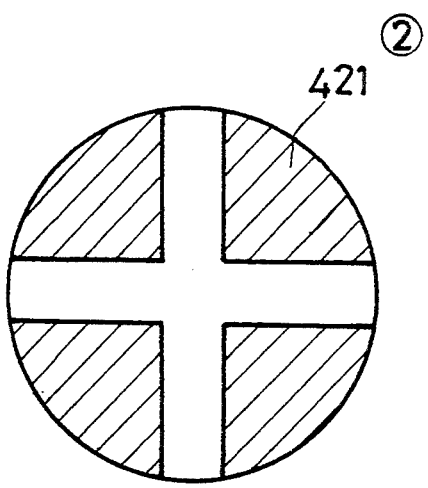
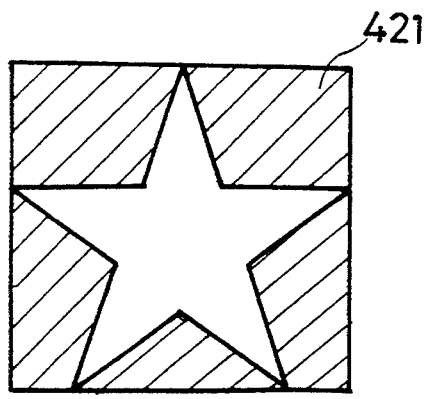 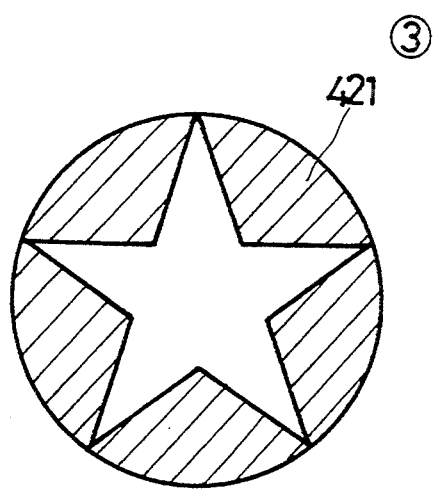
F I G. 8

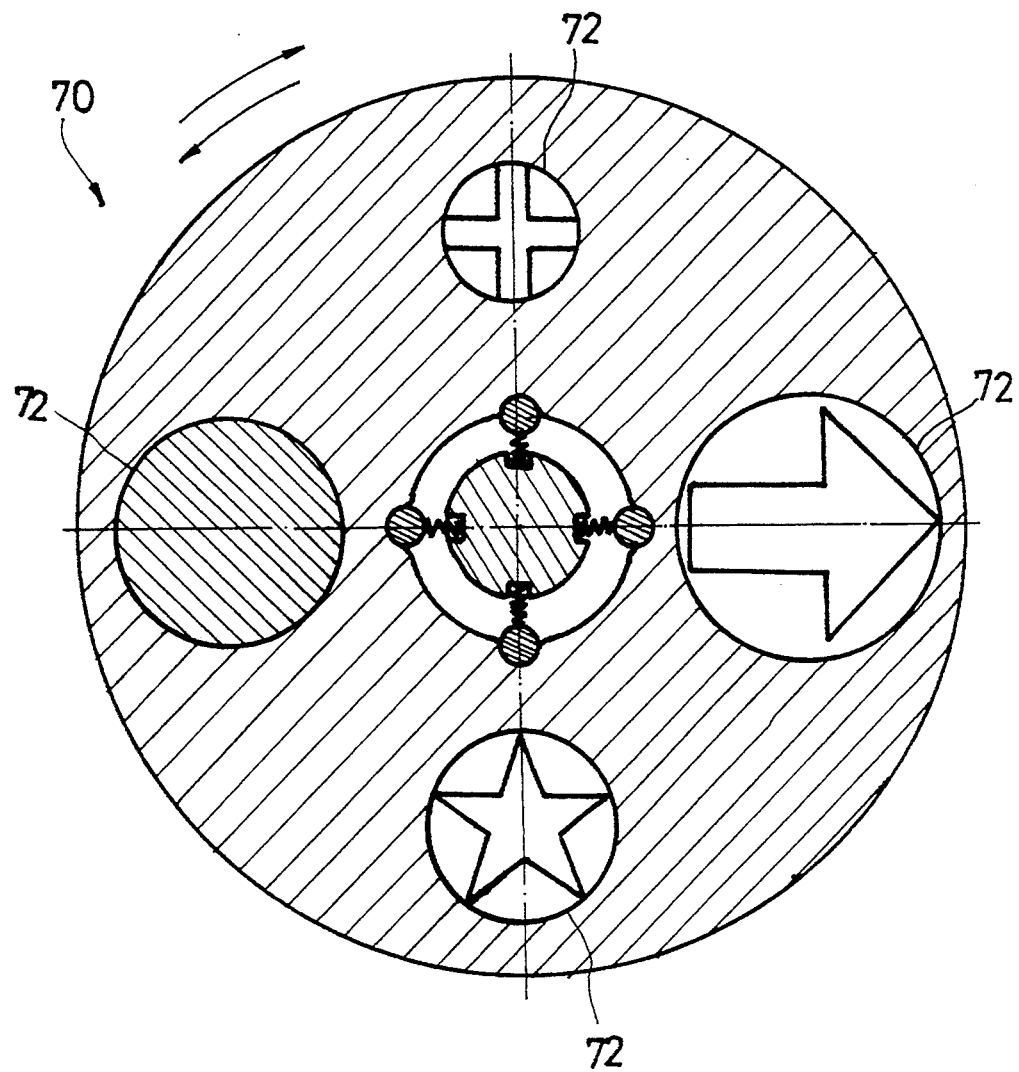
F I G. 11

LASER POINTER WITH SELECTABLE POINTER PATTERNS

FIELD OF THE INVENTION

The present invention relates to a laser pointer for use in projecting a laser beam with variable pointer patterns. More particularly, the present invention relates to a laser pointer for projecting a laser beam having a plurality of selectable pointer patterns onto a projected screen.

BACKGROUND OF THE INVENTION

At present, the commercially available laser pointers can only generate marks of laser beams in a generally circular pattern without the ability of providing pointer pattern selections. In addition, they are not convenient to use in practical applications due to their inability to generate a line-shaped pointer pattern for indicating the portions of the presentation to be emphasized.

SUMMARY OF THE INVENTION

The primary object of the present invention is to provide a laser pointer that can vary of the pattern of the laser beam pointer. A plurality of selectable pointer patterns, or marks, are provided with the laser pointer of the present invention. A presentator can select an appropriate shape of pattern from a variety of laser beam pointer pattern provided in the present invention to make his or her points more clearly presented to the audience. The selectable pointer patterns that can be generated by the laser pointer of the present invention include a line pointer pattern. The utilization of the present invention enables the convenience in making presentations because of the variety of selectable projected beam points that are available to the presenters.

According to a preferred embodiment of the present invention, a mark selector is provided with the laser beam pointer wherein the pointer patterns can be varied by a simple rotation. A set of parallel mirrors are provided inside an external shell housing to cause an incident laser beam to travel through a predetermined path. The laser pointer of the present invention comprises a rotational design, which comprises the aforesaid parallel mirror set, a position pivot, a plurality of position fixing steel beads (i.e., ball beatings), a plurality of springs, and the mark selector described above. A variety of patterns of laser beam pointers can be generated using the rotational design disclosed in the present invention to locate an appropriate mark from the mark selector in the predetermined laser beam path.

According to another preferred embodiment of the present invention, the desired pattern of the laser beam pointer can be selected by a horizontal shifting design using an insertion-retreat type structure. The mark selector uses a horizontal mark position base with a concave arc to match a jutting spring member. The selection of the mark patterns according to the second preferred embodiment of the laser pointer of the present invention is more versatile, because different sets of replaceable pointer patterns can be used with the same mark selector, which permits a horizontal switching of different sets of pointer patterns, thus allowing an even greater variety of pointer patterns to be utilized for various occations.

BRIEF DESCRIPTION OF THE DRAWING

The present invention will be described in detail with reference to the drawing showing the preferred embodiment of the present invention, wherein:

FIG. 1 is an illustration of the external structure of the first preferred embodiment of the laser pointer of the present invention.

FIG. 2 is an axial sectional view of the laser pointer shown in FIG. 1.

FIG. 5 is an example of the pointer pattern assembly of the laser pointer for use with the first preferred embodiment of the present invention.

FIG. 7 is a sectional view of a pointer pattern assembly of the laser pointer of the present invention.

FIG. 8 shows the examples of various pointer patterns that can be utilized in various embodiments of the laser pointer of the present invention.

FIG. 11 is a radial sectional view of a rotational pointer pattern selector of the laser pointer according to the first preferred embodiment of the present invention which provides pointer patterns of varying sizes to be projected.

DETAILED DESCRIPTION OF THE PREFERRED EMBODIMENT

Figure 3:
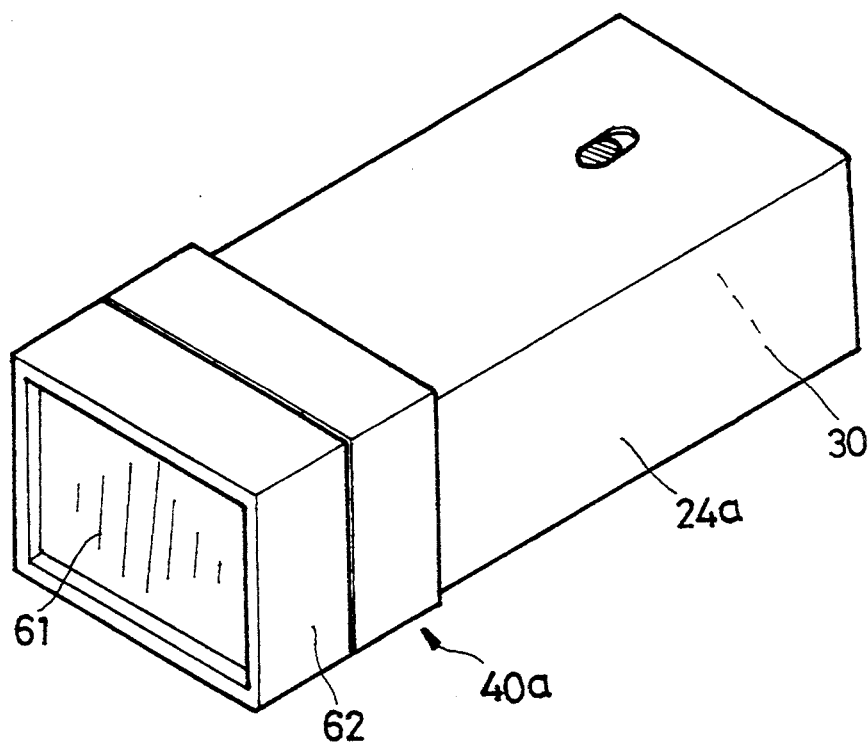
FIG. 3 is an illustration of the external structure of the second preferred embodiment of the laser pointer of the present invention.

FIGS. 1 and 2 indicate the perspective and sectional views, respectively, of the laser pointer of the present invention according to the first preferred embodiment. The laser pointer of the present invention comprises an external shell body 20, which houses a set of two parallel mirrors 21. A circular hole 22 permits the laser beam to pass therethrough. Another hole 23 is provided in the path of the projected laser beam emanated from the mirror set. A ting-shaped concave 24 and a position pivot 25, as shown in FIG. 5, are provided in the front portion of the external shell body 20.

A laser beam generating device 30 is shown in the rear portion of the shell body 20. The laser beam generating device, which is readily available and is a known art in the commercial market, comprises a laser beam module, a control circuit, and a electric power supply. Since the laser beam generating device is well known in the art, it is unnecessary to make a superfluous statement in the present invention.

A rotational mark selector 40 for the mark shape selection is composed of a tubular case 41, which encloses a pointer pattern selector 42, which provides several pointer patterns as shown in FIG. 5. A plurality of arc concaves 45 are located on the internal circumference 46 of the tubular case 41. The arc concaves cooperate with the position pivots 25 by positioning steel balls, or positioning ball bearings, 43, and springs 44 to form a rotational positioning means. An external screw thread 48, shown in FIG. 2, is provided in the front portion of the rotational mark selector 40 to cooperate with the protection lens cover 62. An internal jutting rim 47 is provided in the rear part of the mark selector 40 which can be fitted into the ting-shaped concave 24. Under such a construction, the mark selector can be rotated and then fixed in position. A protective lens 61 and a lens cover 62 with internal screw thread 63 can be fitted to the external screw thread 48 in the front portion of the rotational mark selector 40.

As shown in FIG. 2, a laser beam having a circular shape is emitted from the laser beam generator 30; it passes through a circular hole 22 and changes it direction by means of the parallel mirrors 21 into a new path which passes through the projecting hole 23, the mark selector 40, and then the protective lens 64. Finally it is projected outwardly to create various patterns of laser beam marks. The pointer patterns of the laser beam marks generated from the laser pointer of the present invention can be varied via the aforesaid rotational mark selector 40.

Figure 4:
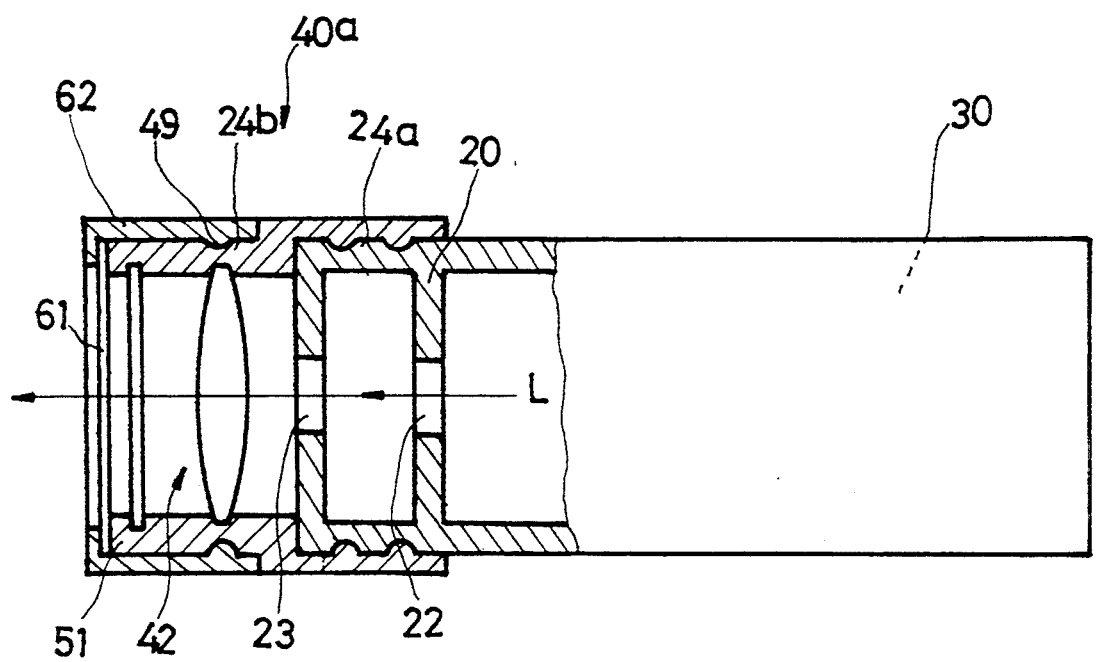
FIG. 4 is an axial sectional view of the laser pointer in FIG. 3.
Figure 6:
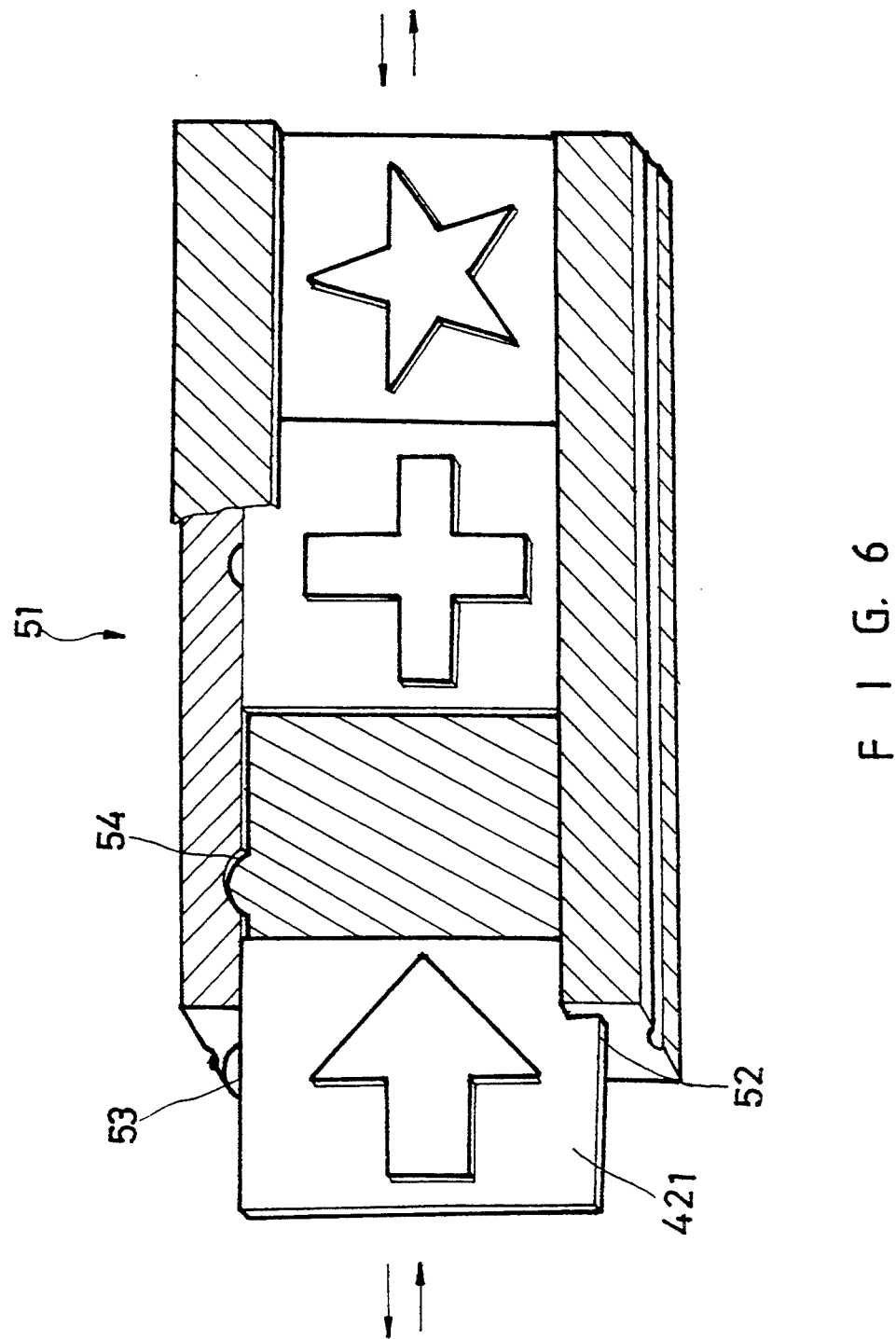
FIG. 6 is an illustration of the pointer pattern assembly of the laser pointer for use with the first preferred embodiment of the present invention.

FIGS. 3 and 4 are the perspective and sectional views, respectively, of the laser point 10 of the present invention according to the second preferred embodiment. It comprises an external shell body 20. Two concave troughs 24a are on its top and bottom ends, respectively, which are connected to a horizontally shifting mark selector 40a. A circular hole 22 and a laser beam projection hole 23 permit a laser beam to pass therethrough. A laser beam generator 30 is placed in the rear portion of the external shell body 20 to emit a laser beam. A horizontally shifting mark selector 40a includes an internal mark position base 51 for loading several mark pattern assemblies 42. As shown in FIG. 6, a horizontal concave guide 52 is provided on the top and bottom rims of the mark position base 51, and a plurality of arc concave 54 are located next to the previous top horizontal concave guide 52. The mark patterns 421 can be fixed in position by matching the jutting spring parts 53 on the mark pattern 421 to the arc concave 54, and allow the laser beam cover to be pulled out for switching. A horizontal concave trough 24b is also provided on the top and bottom of the exterior of the shifting mark selector 40a, respectively, to connect to the protection lens cover 62.

The protection lens 61 is in the front portion of the mark selector 40a and is mantled by a protection lens cover 62. A horizontally jutting rim 49 of the cover is fitted to the horizontal concave trough 24b on the mark selector 40a. The protection lens cover 62 mantles the protection lens 61 and mark position base 51 to achieve the functions of protection and dust-resistance.

A laser beam of circular point pattern emitted from the laser generating device 30 passes through the circular hole 22, the laser protection hole 23, the mark pattern assembly 42, and then the protection lens 61, and projects outwardly to create various mark patterns.

To change the mark patterns, the protection lens cover 62 can be pulled out and separated from the mark selector 40a. A new mark pattern 421 can be placed into the horizontal concave guide 52 of the mark position base 51 by a horizontal movement. This allows varying the mark patterns to be achieved.

FIGS. 7 and 8 indicate the example of the mark pattern assemblies 42 of the laser pointer 10 of the present invention. FIG. 7-1 shows a mark pattern assembly 42, which comprises a magnification lens 422 and a mark pattern 421. The laser beam of a circular point pattern is magnified and then passes through the mark pattern 421 which is in a specific geometrical design to create the desired pattern for the laser pointer. FIG. 7-2 illustrates the mark pattern assembly 42, which comprises a single magnification lens 422 that can magnify the incident laser beam of a circular pattern. FIG. 7-3 indicates a mark pattern assembly 42 which comprises a cylindrical lens 423 that can convert a laser beam of a circular shape into a line shape for utilization in making presentations.

Figure 9:
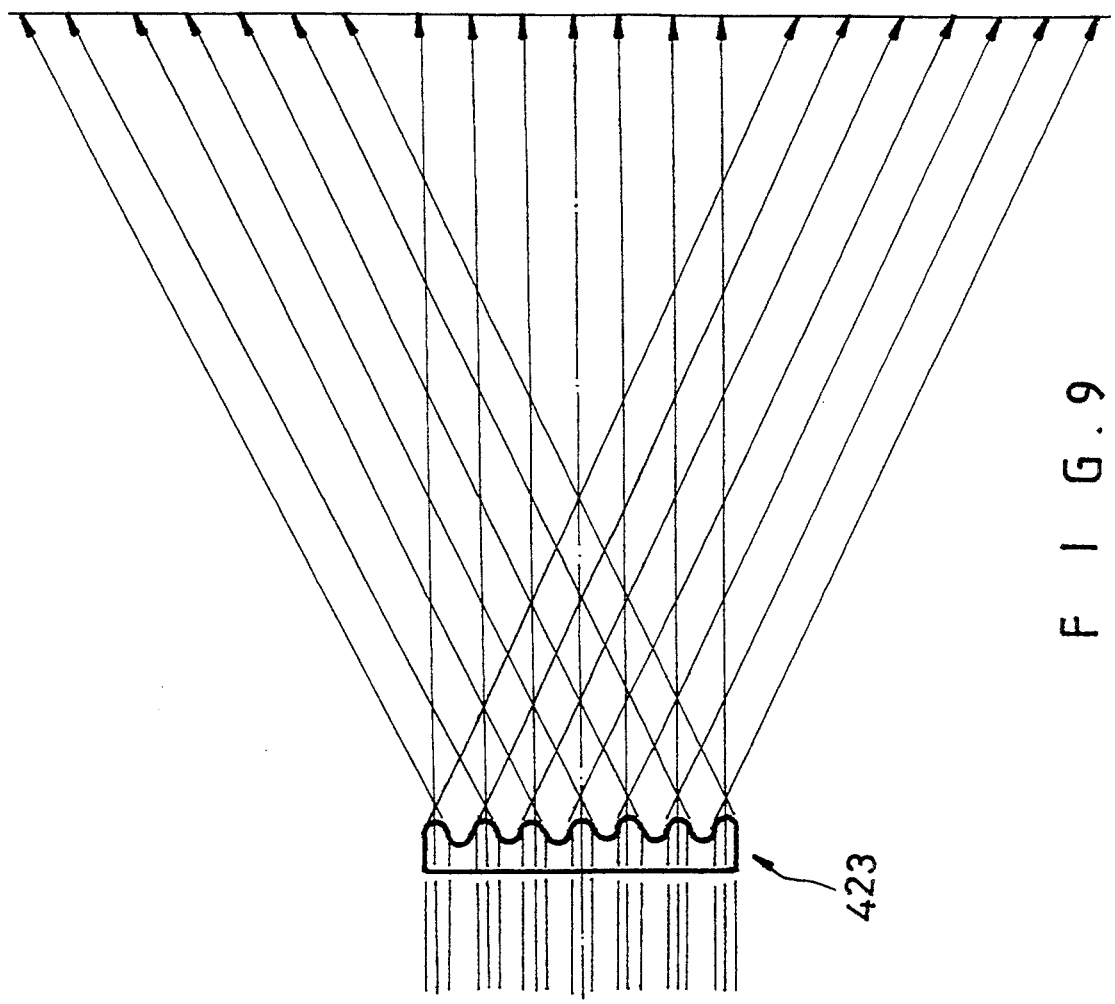
FIG. 9 is a diagram of laser beam projection path generated by a cylindrical lens in an embodiment of the laser pointer of the present invention to show a line-shaped projected pointer pattern.
Figure 10:
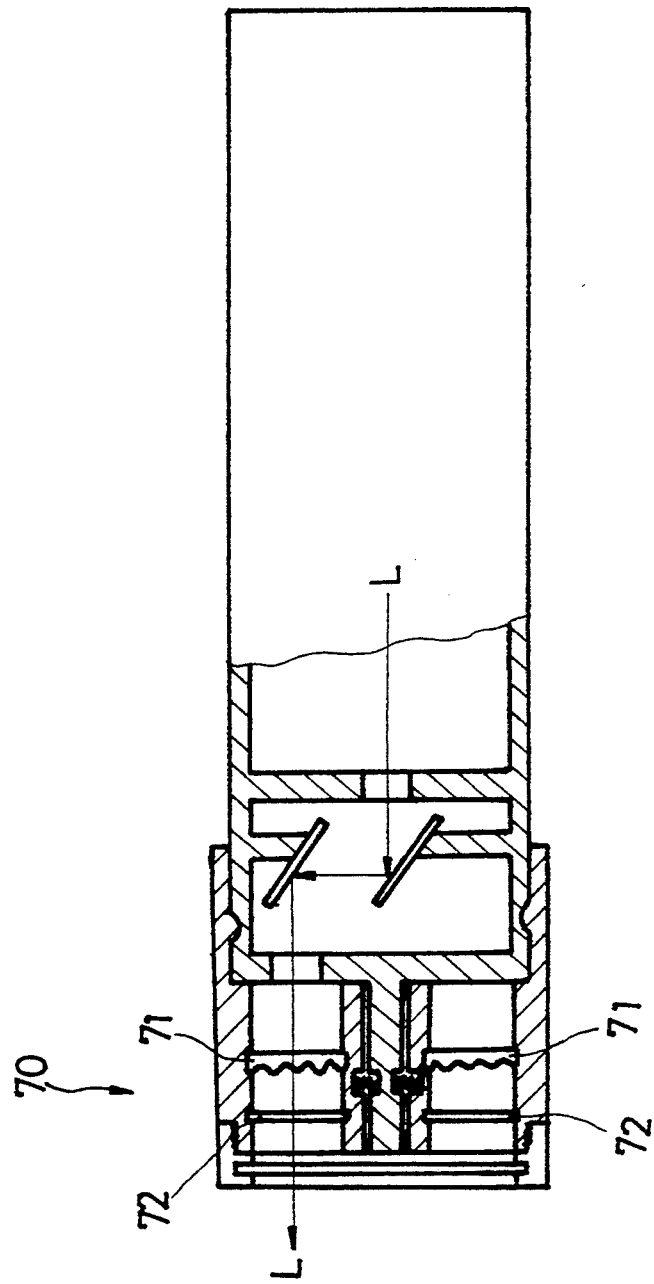
FIG. 10 is an axial sectional view of a laser pointer according to a third preferred embodiment of the present invention which provides line-shaped pointer patterns of varying lengths to be projected.

FIG. 10 is an axial sectional view of a laser pointer according to a third preferred embodiment of the present invention which provides line-shaped pointer patterns of varying lengths to be projected. FIG. 11 is a radial sectional view of a rotational pointer pattern selector of the laser pointer according to the first preferred embodiment of the present invention which provides pointer patterns of varying sizes to be projected. The mark pattern assembly 42 can be equipped with a variety of mark patterns 421. FIG. 8 illustrates several examples of the laser beam pointers in different patterns, such as an arrow, a cross, or a star. It can be of other patterns not shown here. FIG. 9 illustrates how a linear pointer pattern can be generated using a cylindrical lens 423. In FIG. 11, it is shown that the mark patterns 72 can be made of varying sizes. If a linear pointer pattern is projected using a plurality of cylindrical lenses 423, the openings, which are equivalent to the mark patterns shown as 72 in FIG. 11, can be made of varying diameters to provide linear patterns of varying lengths.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A laser pointer for projecting a laser beam with a selectable pointer pattern on a projected screen during presentations comprising:
    a shell body, said shell body having a front portion, a middle portion, and a rear portion;
    a laser beam generating device and a pointer pattern selector, said laser beam generating device being disposed in said rear portion of said shell body and said pointer pattern selector being disposed in said from portion of said shell body;
    wherein said pointer pattern selector comprising a plurality of pointer patterns, and a positioning means for fixing one of said pointer patterns in position so as to project a laser beam having said pointer pattern on said projected screen;
    said pointer pattern selector further comprising a tubular case and said positioning means comprising a rotating means to rotate said tubular case; and
    said tubular case having an internal circumference and said rotating means comprising a plurality of are concaves located on the internal circumference said tubular case and a position pivot, said positioning pivot comprising a plurality of positioning balls, each of said positioning balls, which is to be received by said arc concave, is connected to said positioning pivot via a compression spring.

2. The laser pointer as claimed in claim 1, wherein said pointer pattern selector comprising a rectangle case and capable of being switched by a shifting positioning means.

3. The laser pointer as claimed in claim 1, wherein said laser beam generated from said laser beam generating source having a pre-determined cross-sectional area, and said pointer pattern selector further comprising a plurality of magnifying lenses, each of said magnifying lenses being positioned before a respective pointer pattern so as to enlarge the cross-sectional area of said laser beam from said laser beam generating source before it travels through said pointer pattern.

4. The laser pointer as claimed in claim 3, wherein at least one of said magnifying lenses being a cylindrical lens for projecting a line pointer pattern.

5. The laser pointer as claimed in claim 1, wherein at least one of said pointer patterns being an arrow-shaped pattern.

6. The laser pointer as claimed in claim 1, wherein at least one of said pointer patterns being a cross-shaped pattern.

7. The laser pointer as claimed in claim 1, wherein at least one of said pointer patterns being a star-shaped pattern.

8. The laser pointer as claimed in claim 1, which further comprising a set of mirrors in the middle portion of said shell body changing a path of said laser beam generated from said laser beam generating source.

9. The laser pointer as claimed in claim 8, wherein said set of mirrors comprising a pair of parallel reflection mirrors.

10. A laser pointer for projecting a laser beam with a selectable pointer pattern on a projected screen during presentations comprising:

a shell body, said shell body having a from portion, a middle portion, and a rear portion;

a laser beam generating device and a pointer pattern selector, said laser beam generating device being disposed in said rear portion of said shell body for generating a point-sourced laser beam, and said pointer pattern selector being disposed in said front portion of said shell body; and said pointer pattern selector comprising a plurality of cylindrical lenses for converting said point-sourced laser beam into a line shaped laser beam with a predetermined length, and a plurality of selectable openings of varying sizes so as be project laser beams of selectable lengths on said projected screen.

11. The laser pointer as claimed in claim 10, which further comprising a set of mirrors in the middle portion of said shell body changing a path of said laser beam generated from said laser beam generating source.

12. The laser pointer as claimed in claim 11, wherein said mirror set comprising a pair of parallel reflection mirrors.

13. A laser pointer for projecting a laser beam on a projected screen during presentations comprising:

a shell body, said shell body having a from portion, a middle portion, and a rear portion; and a laser beam generating device and a cylindrical lens, wherein said laser beam generating device being disposed in said rear portion of said shell body for generating a point-sourced laser beam, and said cylindrical lens being disposed in said from portion of said shell body for converting said point-sourced laser beam and projecting a line-shaped pointer pattern on said projected screen.

* * * * *